US012009655B2

(12) United States Patent
Erb et al.

(10) Patent No.: US 12,009,655 B2
(45) Date of Patent: Jun. 11, 2024

(54) SWITCHABLE PYRO FUSE

(71) Applicant: Apple Inc., Cupertino, CA (US)

(72) Inventors: Dylan Erb, San Jose, CA (US); John M. Schoech, San Jose, CA (US); Paul W. Firehammer, Saline, MI (US); Alexander J. Clarabut, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 332 days.

(21) Appl. No.: 17/476,161

(22) Filed: Sep. 15, 2021

(65) Prior Publication Data

US 2023/0078897 A1 Mar. 16, 2023

(51) Int. Cl.
*H01H 39/00* (2006.01)
*H01M 10/625* (2014.01)
(Continued)

(52) U.S. Cl.
CPC ........ *H02H 7/1222* (2013.01); *H01H 39/006* (2013.01); *H01M 10/625* (2015.04); *H01M 50/14* (2021.01); *H02H 3/05* (2013.01)

(58) Field of Classification Search
CPC ..... H02H 7/1222; H02H 3/05; H01M 10/625; H01M 50/14; H01H 9/32; H01H 39/00; H01H 39/006; H01H 2039/008
See application file for complete search history.

(56) References Cited

U.S. PATENT DOCUMENTS 3,053,435 A 9/1962 Sanders et al.
4,224,487 A * 9/1980 Simonsen ............ H01H 39/006
200/61.08
(Continued)

FOREIGN PATENT DOCUMENTS

CN 2601463 Y 1/2004
CN 101326657 A 12/2008
(Continued)

OTHER PUBLICATIONS

U.S. Appl. No. 15/703,114, "Final Office Action", dated Aug. 11, 2022, 22 pages.
(Continued)

*Primary Examiner* — Jacob R Crum
(74) *Attorney, Agent, or Firm* — Kilpatrick Townsend & Stockton LLP (57) ABSTRACT

Exemplary electrical disconnects may include a housing defining a first access at a first end of the housing and a second access at a second end of the housing. The second access may extend vertically along a height of the housing beyond a vertical location of the first access. The electrical disconnects may include a busbar characterized by a first segment and a second segment. The first segment and the second segment may be coupled at a break section of the busbar. The first segment of the busbar may extend through the first access of the housing. The second segment of the busbar may extend through the second access of the housing. The electrical disconnects may include a pyrotechnic initiator disposed within the housing. The electrical disconnects may include a blade laterally aligned with the break section of the busbar. The electrical disconnects may include a plunger within which the blade is seated.

20 Claims, 5 Drawing Sheets

(51) Int. Cl.
  *H01M 50/14*  (2021.01)
  *H02H 3/05*  (2006.01)
  *H02H 7/122*  (2006.01)

(56) References Cited

U.S. PATENT DOCUMENTS

| | | | |
|---|---|---|---|
| 5,990,572 A * | 11/1999 | Yasukuni | H01H 39/006 180/271 |
| 6,278,259 B1 | 8/2001 | Kimoto et al. | |
| 6,556,119 B1 * | 4/2003 | Lell | H01H 37/323 337/182 |
| 8,956,747 B2 | 2/2015 | Itoi et al. | |
| 9,236,208 B2 * | 1/2016 | Ukon | H01H 39/006 |
| 10,923,788 B1 | 2/2021 | Loveness et al. | |
| 11,296,380 B2 | 4/2022 | Miler et al. | |
| 11,296,381 B2 | 4/2022 | Miler et al. | |
| 11,469,471 B1 | 10/2022 | Miler et al. | |
| 11,502,354 B1 | 11/2022 | Loveness et al. | |
| 11,699,821 B2 | 7/2023 | Miler et al. | |
| 11,757,149 B1 | 9/2023 | Hall et al. | |
| 11,764,431 B2 | 9/2023 | Anandarajah et al. | |
| 2004/0069474 A1 | 4/2004 | Wu et al. | |
| 2005/0008929 A1 * | 1/2005 | Brede | H01R 11/287 429/61 |
| 2006/0127765 A1 | 6/2006 | Machida et al. | |
| 2006/0172187 A1 | 8/2006 | Ambrosio et al. | |
| 2009/0274952 A1 | 11/2009 | Wood et al. | |
| 2009/0325054 A1 | 12/2009 | Payne et al. | |
| 2010/0055556 A1 | 3/2010 | Meschter | |
| 2010/0136391 A1 | 6/2010 | Prilutsky et al. | |
| 2010/0279152 A1 | 11/2010 | Payne | |
| 2010/0316894 A1 | 12/2010 | Hermann et al. | |
| 2011/0020676 A1 | 1/2011 | Kurosawa | |
| 2011/0097620 A1 | 4/2011 | Kim | |
| 2011/0111273 A1 | 5/2011 | Okada et al. | |
| 2011/0130049 A1 | 6/2011 | Kaneshiro | |
| 2011/0135975 A1 | 6/2011 | Fuhr et al. | |
| 2011/0195284 A1 | 8/2011 | Yasui et al. | |
| 2012/0002338 A1 | 1/2012 | Smith et al. | |
| 2012/0082880 A1 | 4/2012 | Koetting et al. | |
| 2012/0148889 A1 | 6/2012 | Fuhr et al. | |
| 2012/0194954 A1 * | 8/2012 | Fukuyama | H01H 39/006 361/62 |
| 2012/0231306 A1 | 9/2012 | Herron et al. | |
| 2013/0034755 A1 | 2/2013 | Kim | |
| 2013/0078488 A1 | 3/2013 | Nemoto et al. | |
| 2013/0236754 A1 | 9/2013 | Lim | |
| 2013/0295428 A1 | 11/2013 | Hatta et al. | |
| 2013/0302664 A1 | 11/2013 | Millon | |
| 2014/0023906 A1 | 1/2014 | Hashimoto et al. | |
| 2014/0141309 A1 | 5/2014 | Suzuki | |
| 2014/0162107 A1 | 6/2014 | Obrist et al. | |
| 2014/0234062 A1 | 8/2014 | Adachi et al. | |
| 2014/0302368 A1 | 10/2014 | Wang et al. | |
| 2014/0318106 A1 | 10/2014 | Mizuno et al. | |
| 2014/0329121 A1 | 11/2014 | Nishihara | |
| 2014/0363720 A1 | 12/2014 | Ackermann et al. | |
| 2015/0064514 A1 | 3/2015 | Wu et al. | |
| 2015/0118537 A1 | 4/2015 | Obasih et al. | |
| 2015/0194711 A1 | 7/2015 | Rawlinson | |
| 2015/0244036 A1 | 8/2015 | Lane et al. | |
| 2015/0280189 A1 | 10/2015 | Ohshiba et al. | |
| 2016/0020447 A1 | 1/2016 | Janarthanam et al. | |
| 2016/0036033 A1 | 2/2016 | Zhang et al. | |
| 2016/0093931 A1 | 3/2016 | Rawlinson et al. | |
| 2016/0099451 A1 | 4/2016 | Murai et al. | |
| 2016/0197385 A1 | 7/2016 | Matsumoto et al. | |
| 2016/0218336 A1 | 7/2016 | Herrmann et al. | |
| 2017/0047624 A1 | 2/2017 | Gunna et al. | |
| 2017/0162917 A1 | 6/2017 | Yu et al. | |
| 2017/0170439 A1 | 6/2017 | Jarvis et al. | |
| 2017/0365827 A1 | 12/2017 | Okada et al. | |
| 2018/0138473 A1 | 5/2018 | Bessho et al. | |
| 2018/0183114 A1 | 6/2018 | Rittner et al. | |
| 2018/0215282 A1 | 8/2018 | Pohl et al. | |
| 2018/0294452 A1 | 10/2018 | Tan et al. | |
| 2019/0115573 A1 | 4/2019 | Sakurai | |
| 2019/0157635 A1 | 5/2019 | Miler et al. | |
| 2019/0157636 A1 | 5/2019 | Miler et al. | |
| 2019/0157729 A1 | 5/2019 | Yamashita | |
| 2019/0161909 A1 | 5/2019 | Oikawa et al. | |
| 2019/0181405 A1 | 6/2019 | Kim et al. | |
| 2019/0259996 A1 | 8/2019 | Fritz et al. | |
| 2019/0267682 A1 | 8/2019 | Seo et al. | |
| 2019/0299787 A1 * | 10/2019 | Betscher | B60L 3/04 |
| 2019/0363532 A1 | 11/2019 | Von Zur Muehlen et al. | |
| 2020/0066465 A1 * | 2/2020 | Moszynski | H01H 9/32 |
| 2020/0067156 A1 | 2/2020 | Chi et al. | |
| 2020/0106075 A1 | 4/2020 | Yanagida | |
| 2020/0144576 A1 | 5/2020 | Yoshida et al. | |
| 2020/0161716 A1 | 5/2020 | Haindl et al. | |
| 2020/0161728 A1 | 5/2020 | Wang | |
| 2020/0220147 A1 | 7/2020 | Haino et al. | |
| 2021/0013478 A1 | 1/2021 | Sasaki et al. | |
| 2021/0020890 A1 | 1/2021 | Omura et al. | |
| 2021/0126311 A1 | 4/2021 | Jang et al. | |
| 2021/0183607 A1 | 6/2021 | Schlaak et al. | |
| 2021/0313635 A1 | 10/2021 | Wang et al. | |
| 2022/0111758 A1 | 4/2022 | Ijaz et al. | |
| 2022/0111759 A1 | 4/2022 | Ijaz | |
| 2022/0115897 A1 | 4/2022 | Ijaz | |
| 2023/0026549 A1 | 1/2023 | Ijaz et al. | |

FOREIGN PATENT DOCUMENTS

| | | |
|---|---|---|
| CN | 101483227 A | 7/2009 |
| CN | 101523637 A | 9/2009 |
| CN | 101627490 A | 1/2010 |
| CN | 102007619 A | 4/2011 |
| CN | 102054951 A | 5/2011 |
| CN | 103229326 A | 7/2013 |
| CN | 103579713 A | 2/2014 |
| CN | 203871442 U | 10/2014 |
| CN | 204243106 U | 4/2015 |
| CN | 105518899 A | 4/2016 |
| CN | 205177921 U | 4/2016 |
| CN | 105742535 A | 7/2016 |
| CN | 105789507 A | 7/2016 |
| CN | 208585211 U | 3/2019 |
| DE | 10049071 A1 | 4/2002 |
| DE | 102013015749 A1 | 3/2015 |
| DE | 102017118519 A1 | 2/2019 |
| EP | 1091438 A2 | 4/2001 |
| EP | 2262048 A1 | 12/2010 |
| EP | 2320493 A1 | 5/2011 |
| EP | 3346517 A1 | 7/2018 |
| JP | 2011175844 A | 9/2011 |
| JP | 2015002166 A | 1/2015 |
| WO | 2007047317 A2 | 4/2007 |
| WO | 2011134815 A1 | 11/2011 |
| WO | 2011134828 A1 | 11/2011 |
| WO | 2017017913 A1 | 2/2017 |
| WO | 2018022964 A1 | 2/2018 |
| WO | 2018023050 A1 | 2/2018 |
| WO | 2018277608 A1 | 11/2018 |
| WO | 2019188214 A1 | 10/2019 |
| WO | 2020134051 A1 | 7/2020 |
| WO | 2020134054 A1 | 7/2020 |
| WO | 2020134070 A1 | 7/2020 |
| WO | 2020159082 A1 | 8/2020 |
| WO | 2021088570 A1 | 5/2021 |

OTHER PUBLICATIONS

U.S. Appl. No. 15/885,126 , "Advisory Action", dated Apr. 15, 2022, 4 pages.
U.S. Appl. No. 16/263,907 , "Corrected Notice of Allowability", dated Sep. 9, 2022, 2 pages.
U.S. Appl. No. 16/263,907 , "Notice of Allowance", dated Jun. 1, 2022, 8 pages.
U.S. Appl. No. 16/711,829 , "Final Office Action", dated Jul. 28, 2022, 24 pages.

(56) References Cited

OTHER PUBLICATIONS

U.S. Appl. No. 17/175,270, "Notice of Allowability", dated Aug. 31, 2022, 2 pages.
U.S. Appl. No. 17/175,270, "Notice of Allowance", dated Jun. 28, 2022, 8 pages.
China Patent Application No. 201910307710.1, "Office Action", dated Mar. 2, 2022, 20 pages.
China Patent Application No. 201910339097.1, "Office Action", dated Apr. 12, 2022, 17 pages.
China Patent Application No. 201910339097.1, "Office Action", dated Jun. 24, 2022, 10 pages.
U.S. Appl. No. 17/452,683, "Non-Final Office Action", dated Mar. 21, 2023, 14 pages.
International Patent Application No. PCT/US2021/053553, "International Preliminary Report on Patentability", dated May 4, 2023, 8 pages.
U.S. Appl. No. 17/318,188, "Non-Final Office Action", dated Jun. 23, 2023, 17 pages.
U.S. Appl. No. 17/318,174, "Non-Final Office Action", dated Jun. 23, 2023, 15 pages.
U.S. Appl. No. 15/885,126, "Non-Final Office Action", dated Nov. 3, 2022, 11 pages.
U.S. Appl. No. 15/703,114, Non-Final Office Action, dated Dec. 17, 2021, 24 pages.
U.S. Appl. No. 15/885,126, Final Office Action, dated Jan. 6, 2022, 15 pages.
U.S. Appl. No. 16/711,829, Non-Final Office Action, dated Feb. 4, 2022, 19 pages.
Application No. PCT/US2021/053553, International Search Report and Written Opinion, dated Jan. 20, 2022, 12 pages.
U.S. Appl. No. 17/318,174, Final Office Action, dated Feb. 16, 2023, 15 pages.
U.S. Appl. No. 17/448,756, Non-Final Office Action, dated Feb. 1, 2023, 23 pages.
Gunther, Machine Translation of DE 102017118519 A1, 2017, 35 pages.
International Patent Application No. PCT/US2022/042873, International Search Report and Written Opinion, dated Jan. 5, 2023, 13 pages.
Zhongke et al., Machine Translation of CN 208585211 U, 2019, 28 pages.
U.S. Appl. No. 17/175,270, Non-Final Office Action, dated Mar. 17, 2022, 11 pages.
U.S. Appl. No. 15/703,114, "Final Office Action", dated Mar. 16, 2020, 22 pages.
U.S. Appl. No. 15/703,114, "Non-Final Office Action", dated Aug. 22, 2019, 15 pages.
U.S. Appl. No. 15/794,200, "Non-Final Office Action", dated Mar. 19, 2020, 10 pages.
U.S. Appl. No. 15/794,200, "Notice of Allowance", dated Oct. 29, 2020, 8 pages.
U.S. Appl. No. 15/885,126, "Final Office Action", dated Sep. 3, 2020, 14 pages.
U.S. Appl. No. 15/885,126, "Non-Final Office Action," dated Jan. 6, 2020, 20 pages.
U.S. Appl. No. 15/885,126, Non-Final Office Action, dated Aug. 10, 2021, 15 pages.
U.S. Appl. No. 16/259,440, "Non-Final Office Action", dated Mar. 19, 2021, 12 pages.
U.S. Appl. No. 16/259,584, "Final Office Action", dated Jun. 7, 2021, 13 pages.
U.S. Appl. No. 16/259,584, "Non-Final Office Action", dated Nov. 10, 2020, 16 pages.
U.S. Appl. No. 16/263,907, "Non-Final Office Action", dated Mar. 30, 2021, 12 pages.
China Patent Application No. 201910307710.1, "Office Action", dated Jul. 26, 2021, 17 pages.
China Patent Application No. 201910339097.1, "Office Action", dated Jun. 29, 2021, 17 pages.
Klambauer et al., "cn.MOPS: Mixture of Poissons for Discovering Copy Number Variations in Next-Generation Sequencing Data with a Low False Discovery Rate", Nucleic Acids Research, vol. 40, No. 9, Feb. 1, 2012, pp. 1-14.
PCT Application No. PCT/US2017/044316, "International Preliminary Report on Patentability", dated Feb. 7, 2019, 7 pages.
PCT Application No. PCT/US2017/044316, "International Search Report and Written Opinion", dated Nov. 15, 2017, 10 pages.
PCT Application No. PCT/US2017/044474, "International Preliminary Report on Patentability", dated Feb. 7, 2019, 8 pages.
PCT Application No. PCT/US2017/044474, "International Search Report and Written Opinion", dated Oct. 24, 2017, 10 pages.
PCT/US2022/042877, "International Search Report and the Written Opinion", dated Jan. 2, 2023, 13 pages.
U.S. Appl. No. 17/077,259, "Non-Final Office Action", dated Oct. 6, 2022, 16 pages.
U.S. Appl. No. 17/175,270, "Corrected Notice of Allowability", dated Oct. 13, 2022, 2 pages.
U.S. Appl. No. 17/317,849, "Non-Final Office Action", dated Oct. 6, 2022, 15 pages.
U.S. Appl. No. 17/318,174, "Non-Final Office Action", dated Oct. 14, 2022, 13 pages.
U.S. Appl. No. 17/318,182, "Non-Final Office Action", dated Oct. 6, 2022, 14 pages.
U.S. Appl. No. 17/318,188, "Non-Final Office Action", dated Oct. 6, 2022, 16 pages.
China Patent Application No. 201910307710.1, "Notice of Decision to Grant", dated Sep. 20, 2022, 6 pages.
China Patent Application No. 201910339097.1, "Office Action", dated Oct. 8, 2022, 7 pages.
U.S. Appl. No. 16/263,907, "Non-Final Office Action", dated Nov. 1, 2021, 11 pages.
English Translation of WO 2020159082 A1, dated Aug. 6, 2020, 56 pages.
U.S. Appl. No. 17/318,182, Non-Final Office Action, dated Aug. 17, 2023, 15 pages.
U.S. Appl. No. 17/448,756, Final Office Action, dated Aug. 18, 2023, 16 pages.
U.S. Appl. No. 16/259,440, "Notice of Allowability", dated Dec. 9, 2021, 2 pages.
U.S. Appl. No. 16/259,440, "Notice of Allowance", dated Dec. 1, 2021, 7 pages.
U.S. Appl. No. 16/259,584, "Notice of Allowance", dated Dec. 10, 2021, 12 pages.
International Patent Application No. PCT/US2023/023478, International Search Report and Written Opinion, dated Sep. 7, 2023, 12 pages.
U.S. Appl. No. 17/318,174, "Final Office Action", dated Nov. 24, 2023, 15 pages.
U.S. Appl. No. 17/318,182, "Final Office Action", dated Dec. 14, 2023, 17 pages.
U.S. Appl. No. 18/327,648, "Final Office Action", dated Dec. 6, 2023, 15 pages.
U.S. Appl. No. 18/329,554, "Non-Final Office Action", dated Nov. 3, 2023, 11 pages.
U.S. Appl. No. 18/329,558, "Non-Final Office Action", dated Nov. 2, 2023, 9 pages.

* cited by examiner

SWITCHABLE PYRO FUSE

TECHNICAL FIELD

The present technology relates to electrical disconnects. More specifically, the present technology relates to electrical disconnects incorporating a pyrotechnic initiator.

BACKGROUND

Many battery systems or other electrical systems may include fuses or circuit breakers for disconnecting the systems under a variety of circumstances. As electrical systems are characterized by increased power or voltage output, improved disconnects are needed. These and other needs are addressed by the present technology.

SUMMARY

Exemplary electrical disconnects may include a housing defining a first access at a first end of the housing and a second access at a second end of the housing opposite the first end of the housing. The second access may extend vertically along a height of the housing beyond a vertical location of the first access. The electrical disconnects may include a busbar characterized by a first segment and a second segment. The first segment and the second segment may be coupled at a break section of the busbar. The first segment of the busbar may extend through the first access of the housing. The second segment of the busbar may extend through the second access of the housing. The electrical disconnects may include a pyrotechnic initiator disposed within the housing. The electrical disconnects may include a blade laterally aligned with the break section of the busbar. The electrical disconnects may include a plunger within which the blade is seated.

In some embodiments, the pyrotechnic initiator may be operationally accessible from the second end of the housing. The pyrotechnic initiator may be positioned along a height of the housing between the first access defined in the housing and a location where the second segment of the busbar extends from the second access defined in the housing. The electrical disconnects may include a barrel defining a recess in which the pyrotechnic initiator may be seated. A portion of the barrel may extend within a recess defined within the busbar. A first end of the plunger may be characterized by an exterior diameter less than a diameter of the recess defined in the barrel. The first end of the plunger may be disposed within the recess of the barrel. The plunger may define a recess in the first end of the plunger. The pyrotechnic initiator may extend within the recess defined in the first end of the plunger when the plunger is located in a first position within the housing.

The plunger may be moveably disposed within the housing between a first position within the housing in which the pyrotechnic initiator is adjacent the plunger and a leading edge of the blade may be positioned on a first side of the break section of the busbar and a second position within the housing in which the leading edge of the blade may be located on a second side of the break section of the busbar opposite the first side of the break section. The second segment of the busbar at the second access may extend substantially parallel to the first segment of the busbar at the first access. The break section of the busbar may extend normal to the first segment of the busbar at the first access and the second segment of the busbar at the second access. The housing may define a protrusion extending from a top of the housing towards the break section of the busbar and adjacent the second segment of the busbar. The break section of the busbar may be characterized by a thickness less than a thickness of either the first segment of the busbar or the second segment of the busbar. The blade may be ceramic. The blade may be characterized by a V-shape along a leading edge of the blade.

The plunger may include a blade housing characterized by a base and sidewalls. The sidewalls of the blade housing may extend on either side and in line with the second segment of the busbar. A base of the housing may define an angled protrusion over which the base of the blade housing may travel during operation of the electrical disconnect. The electrical disconnect may include an activation circuit comprising overcurrent detection coupled with the busbar. The overcurrent detection may be communicatively coupled with a trigger of the pyrotechnic initiator. The activation circuit may include a connector coupleable with an external management system and operable to receive a signal from the external management system to trigger the pyrotechnic initiator.

Some embodiments of the present technology may encompass electrical disconnects. The electrical disconnects may include a housing defining a first access at a first end of the housing and a second access at a second end of the housing opposite the first end of the housing. The second access may extend vertically along a height of the housing beyond a vertical location of the first access. A base of the housing may define a track. The housing may define a vent at the first end of the housing. The electrical disconnects may include a busbar characterized by a first segment and a second segment. The first segment of the busbar may extend through the first access of the housing. The second segment of the busbar may extend through the second access of the housing. The electrical disconnects may include a barrel positioned proximate the second end of the housing. The electrical disconnects may include a pyrotechnic initiator disposed within the barrel and electrically accessible through the second end of the housing. The electrical disconnects may include a blade. The electrical disconnects may include a plunger within which the blade is seated. The plunger may be movably disposed within the track defined in the base of the housing. In some embodiments, the plunger may include a blade housing characterized by a base and sidewalls. The sidewalls of the blade housing may extend on either side and in line with the second segment of the busbar. The base of the blade housing may be seated in the track defined in the base of the housing.

Some embodiments of the present technology may encompass electrical disconnects. The electrical disconnects may include a housing defining a first access at a first end of the housing and a second access at a second end of the housing opposite the first end of the housing. The second access may extend vertically along a height of the housing beyond a vertical location of the first access. The electrical disconnects may include a busbar characterized by a first segment and a second segment. The first segment and the second segment may be coupled at a break section of the busbar. The first segment of the busbar may extend through the first access of the housing. The second segment of the busbar may extend through the second access of the housing. The second segment of the busbar at the second access may extend substantially parallel to the first segment of the busbar at the first access.

The break section of the busbar may extend normal to the first segment of the busbar at the first access and the second segment of the busbar at the second access. The electrical disconnects may include a pyrotechnic initiator disposed within the housing. The electrical disconnects may include a blade laterally aligned with the break section of the busbar. The electrical disconnects may include a plunger within which the blade is seated. In some embodiments, the plunger may be moveably disposed within the housing between a first position within the housing in which the pyrotechnic initiator is adjacent the plunger and a leading edge of the blade is positioned on a first side of the break section of the busbar, and a second position within the housing in which the leading edge of the blade is located on a second side of the break section of the busbar opposite the first side of the break section.

Such technology may provide numerous benefits over conventional systems and techniques. For example, the electrical disconnects may ensure improved insulation of severed components of the disconnects subsequent operation. Additionally, the devices may be characterized by improved profiles allowing reduced sizing of the disconnects, which may reduce the footprint of the devices in which the disconnects are incorporated, or increase available space for other electrical components. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION

Electrical disconnects are associated with any number of systems or modules. From simple fuses to circuit breakers and mechanical disconnects, electrical disconnects may be used to ensure a capability to halt electrical flow within the system. While many circuit breakers provide reversible control on electrical flow within the circuit, conventional circuit breakers may have limitations for onboard control systems. For example, many power modules and battery packs may be produced to provide increasingly high voltage and current for electrical operation of ever more complex devices. As these devices or systems are used in mobile operation, new challenges may arise for which circuit breakers designed for stable structures, such as buildings, may be insufficient.

The present technology overcomes many of these challenges with an electrical disconnect including a pyrotechnic initiator or actuator, which may ensure complete severing of a conductive member of the conductive system. Conventional electrical disconnects may be excessively heavy and characterized by fairly large dimensions, which can impact placement or space for additional materials, including battery cells, as one non-limiting example. Additionally, conventional electrical disconnects may be susceptible to electrical arcing for high-voltage applications, even after the disconnect has been engaged. The present technology overcomes these limitations by utilizing a configuration that facilitates complete separation and insulation between the severed components. Additionally, the configuration may be characterized by reduced weight and size, which may facilitate incorporation in devices or systems characterized by more constrained footprints.

Although the remaining portions of the description will routinely reference battery systems, it will be readily understood by the skilled artisan that the technology is not so limited. The present designs may be employed with any number of battery or other electrical systems, including power systems, mobile systems, and remotely-controlled systems. Moreover, the present technology may be applicable to systems or devices used in any number of technologies that may include, without limitation, mobile electronic devices, computers or computer systems, appliances, heavy machinery, transportation equipment including automobiles, water-faring vessels, air travel equipment, and space travel equipment, as well as any other device that may use electrical distribution sub-systems or may otherwise benefit from the discussed designs. Accordingly, the disclosure and claims are not to be considered limited to any particular example discussed, but can be utilized broadly with any number of devices that may exhibit some or all of the electrical or operational characteristics of the discussed examples.

Figure 1:
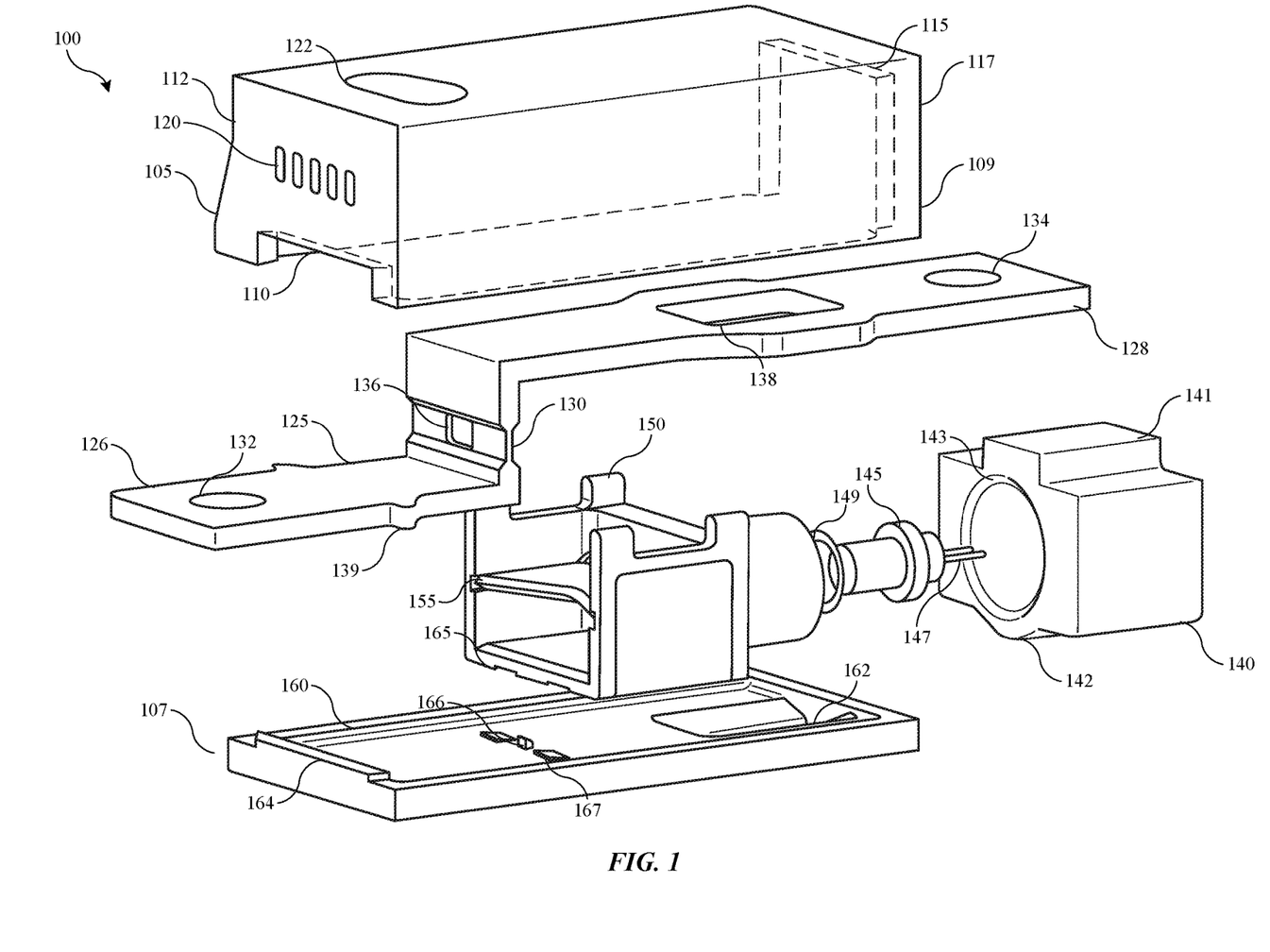
FIG. 1 shows an exploded perspective view of components of an exemplary electrical disconnect according to embodiments of the present technology.

Turning to FIG. 1 is shown an exploded perspective view of components of an exemplary electrical disconnect 100 according to embodiments of the present technology. Although the remaining disclosure will consider the exemplary structure illustrated, it is to be understood that any number of component adjustments or modifications are equally encompassed by the present technology, and the claims should not be considered limited by any specific component illustration or feature discussion within the description. Electrical disconnects according to some embodiments of the present technology may include some or all of the features and characteristics shown, which may be presented or illustrated together for ease of explanation, but with no intention of limiting the technology.

As illustrated, electrical disconnect 100 may include one or more components configured as an apparatus that may be controlled or operated to sever an electrical connection facilitated through the component. For example, electrical disconnect 100 may include a housing 105, which may include multiple portions, such as a base 107, and a cover 109, as illustrated. Any number of pieces may be coupled together or indirectly with one another to form a package of the disconnect. In some embodiments, such as illustrated, base 107 may seat one or more of the components, while cover 109 may enclose the device, and may protect the device or incorporated components from environmental materials. The two components may have mating features as illustrated, which may allow screws, bolts, or other fasteners to secure the components of the housing. The base and cover of housing 105 may facilitate operation of the electrical disconnect by defining one or more aspects that control component movement within the electrical disconnect. Although illustrated as two components that may be fastened or otherwise removably coupled together, it is to be understood that any number of couplings may be covered by embodiments of the present technology, including snap connections or fittings, adhesives or bonding, or any other coupling that may be used to secure the housing portions together.

Housing 105, such as cover 109 as illustrated, may define a first access 110, which may be located at a first end 112 of the housing. Additionally, the housing may define a second access 115, which may be located at a second end 117 of the housing, such as an end opposite the first end 112 of the housing, and which is shown in hidden view in this perspective. As illustrated, although first access 110 is laterally aligned with a portion of second access 115 in this illustration, second access 115 may extend vertically along a height of the housing beyond a vertical location of the first access 110, such as providing access at the second end from a different or extended vertical location along a height of the cover 109 of the housing, including from a location vertically offset from the location of the first access 110. Second access 115 may provide access along the height of the cover of the housing, although in some embodiments the second access 115 may provide access that extends to a vertically offset location from the extent of access provided by first access 110. It is to be understood that terms such as "height", "horizontal", or "vertical", among other directional or locational terms, may be orientation specific, and one of skill would readily appreciate that changing the orientation of the electrical disconnect may affect the terminology. The words of orientation are related to the illustration, and not to any specific orientation within a system or device.

Each of the first access 110 and the second access 115 may be at least partially defined by the base 107 as well, which may fully define the accesses with the cover 109. As will be described further below, this may facilitate busbar configurations in which a first end of the busbar may be vertically offset from a second end of the busbar. Additionally along the first end of the cover 109 may be defined one or more vents 120. In some embodiments, a filter, such as a paper filter, may be positioned along an interior surface of the vents, which may limit effluent egression from the housing. The cover may also define a protrusion 122, which may extend inward from a top of the cover towards the base, and which may extend along a portion of a busbar, as will be shown further below. As shown, protrusion 122 may not extend fully along the width of the housing to allow travel of components as will be described further below.

Electrical disconnect 100 may include a busbar 125, which may be disposed within the housing. Busbar 125 may be a continuous metal or conductive element, which may include multiple segments coupled about a break section. For example, busbar 125 may include a first segment 126 and a second segment 128. First segment 126 and second segment 128 may be coupled at break section 130 of the busbar. As shown, the three segments may be continuous and formed as a single piece, however, break section 130 may have one or more characteristics defining the section, and to which each of the first segment and the second segment may extend. For example, break section 130 may be characterized by a reduced thickness as compared to portions of the first segment and the second segment. The thickness may be any thickness less than the thickness of any portion of the first or second segments. In some embodiments, the break section 130 may be characterized by a thickness that is less than or about 90% of a thickness of any portion of the first segment or the second segment, and may be less than or about 75% the thickness, less than or about 50% the thickness, less than or about 25% the thickness, or less. However, the break section may be sized to ensure limited heat or resistance increases across the section during normal operation, as the disconnect may be incorporated in high voltage and/or high current systems. For example, the break may be sized to ensure heat generation during normal operation does not cause thermal fusing of the section.

When the components are coupled together as a disconnect, as will be shown in the following illustrations, the first segment 126 of the busbar 125 may extend through the first access 110 of the housing 105. Additionally, the second segment 128 of the busbar may extend through the second access 115 of the housing. The busbar 125 may also define one or more apertures that may facilitate connection of the disconnect within a system, as well as positioning of the busbar within the electrical disconnect. For example, busbar 125 may define an aperture 132 proximate an external end of the first segment 126 of the busbar, and the busbar may define an aperture 134 proximate an external end of the second segment 128 of the busbar. The apertures may be sized for electrical couplings within an electrical system, which may be or include any system or device as previously described. Busbar 125 may also define one or more apertures within the break section 130, such as aperture 136 as illustrated. Aperture 136 may be included based on a shape of a blade used against the disconnect, as will be described further below. For example, for a blade that may simultaneously contact both edges of the break section, and finish a cut at a center of the break section, incorporating an aperture at the center of the break section may facilitate complete severing of the break section, or may reduce the force required for complete severing of the break section.

Busbar 125 may also define an aperture 138, which may be located along the second segment 128, such as between an end extending through the second access of the housing, and a location where the second segment transitions to the break section 130. The aperture 138 may be sized to receive a portion of a component of the electrical disconnect, such as a barrel as described below. As illustrated, the second segment 128 may be characterized by an increased width across the portion where aperture 138 is defined, which may maintain equal conductance along the busbar segment at this location, and may limit increases in heat or resistance at the location during normal operation. A leading edge of this increased width may be nearer the break section of the busbar, while a trailing edge of this increased width may be proximate where the second segment extends from the housing through the second access. For example, the increased width may end prior to a location where the second segment extends outside of the housing.

The location of increased width may also coincide with, or extend to, a location where the busbar meets an interior edge of the housing at the second access. At this location, where the busbar is characterized by increased width, the second segment of the busbar may be characterized by a width greater than a width of the second access 115. This may ensure that upon activation of the disconnect, the second segment is maintained within the housing. Similarly, first segment 126 may define one or more protrusions 139, which may coincide with, or extend to, a location where the busbar meets an interior edge of the housing at the first access 110. At this location, where the busbar may be characterized by increased width due to the protrusions, the first segment of the busbar may be characterized by a width greater than a width of the first access 110. This may ensure that upon activation of the disconnect, the first segment is maintained within the housing.

As illustrated, the second segment 128 of the busbar may be vertically offset from the first segment 126 of the busbar, and the two segments may be joined vertically by the break section 130. Each of the first segment 126 and the second segment 128 may be characterized by an arcuate shape where the segments transition from horizontal to vertical and extend into the break section 130. Aside from these transition portions adjacent the break section 130, first segment 126 and second segment 128 may extend substantially parallel to one another within the electrical disconnect along two vertically separated horizontal planes along the height of the electrical disconnect. By "substantially" within the context of this disclosure is meant, for example, that the portions may not extend with perfect parallelism, but are generally parallel within machine or formation tolerances, as would be appreciated by one of skill. Break section 130 may extend substantially normal to the first segment of the busbar at the first access and the second segment of the busbar at the second access. Accordingly, in some embodiments, when the busbar is severed, the break may occur along a horizontal plane through the break section, which is between the first horizontal plane of the first segment of the busbar and the second horizontal plane of the second segment, less the arcuate portions of the two segments extending to the break section.

Positioned within the housing may be a barrel 140, which may be disposed adjacent the second access 115, and which may provide accessibility through second access 115. Barrel 140 may be characterized by a first boss 141, which may be sized to extend through aperture 138 defined through the busbar. First boss 141 may extend the length of the barrel 140 in some embodiments. First boss 141 may also participate in maintaining the second segment of the busbar within the housing upon actuation of the disconnect. Barrel 140 may also define a second boss 142, which may extend from an opposite surface of the barrel 140, such as from the bottom as shown, and may seat in base 107 of the housing. Barrel 140 may define a recess 143, such as a cylindrical recess, extending within the barrel. Recess 143 may be characterized by a diameter about the recess.

Because the barrel 140 may contain a pyrotechnic action, barrel 140 may be characterized by a thickness of material surrounding the recess, which may be sufficient to maintain the action. While sides of the barrel 140 may be sufficiently thick, increasing a thickness of material on the top or bottom of the barrel may increase the overall height of the electrical disconnect. However, in some embodiments of the present technology, barrel 140 may be characterized by a height at the edges that is less than a width of the barrel as illustrated, which may provide a lower profile for the disconnect, and which may be equal to or less than a diameter of the recess 143. Accordingly, along a center of the barrel, first boss 141 and second boss 142 may provide additional material to maintain sufficient thickness of the barrel. Consequently, such as for first boss 141, the boss may both ensure adequate thickness of barrel material, and provide a feature to maintain the second segment of the busbar subsequent activation of the disconnect, while also minimizing a height profile of the electrical disconnect, as the boss may extend into the busbar.

Electrical disconnect 100 may include an actuator, which may be a pyrotechnic initiator 145 or pyrotechnic actuator in some embodiments of the present technology. The pyrotechnic initiator may include an electrical connector 147, such as prongs, which may receive a signal or current sufficient to trigger the actuator and cause ignition of a pyrotechnic element. The pyrotechnic initiator 145 may be disposed within the housing, and may be accessible from the second access, such as through the barrel 140. Pyrotechnic initiator 145 may be positioned within the recess of the barrel 140. The pyrotechnic initiator may include any type or pyrotechnic element, which upon ignition may cause gas generation and/or solid output. The generation may be contained within the barrel 140, which may cause an expulsion in the opposite direction, such as towards the first segment of the busbar and the vents 120 within the housing. In some embodiments an elastomeric element 149, or o-ring, may be positioned about the pyrotechnic charge material, which may further control the direction of expulsion to be substantially parallel to the first segment of the busbar and the second segment of the busbar.

A plunger 150 may also be included within the housing, and may be engaged with the pyrotechnic initiator 145. Plunger 150 may include a blade 155 seated within the plunger, and which may be used to sever the break section 130 of the busbar. Plunger 150 may be seated within the base 107 of the housing 105, which may define a recessed track 160, along which the plunger may travel when the pyrotechnic initiator fires. Base 107 may also define a recess 162 sized to fit second boss 142 of barrel 140. Base 107 may define one or more features to maintain a position of the plunger both prior to and subsequent to firing of the pyrotechnic initiator 145. For example, a stop 164 may be defined in the base of the housing, which may protrude from a surface of the base at a location of the first access. This may provide increased material strength at this area, while limiting any effect on a height of the electrical disconnect. The stop 164 may ensure an edge of the base is not shorn from the base when contacted by the plunger, and the stop may halt further travel of the plunger in a direction from the second end 117 to the first end 112 of the housing.

Additionally, base 107 may define a post 166, protruding within the track. Post 166 may be positioned to contact the plunger in a first operational position, such as prior to firing of the pyrotechnic initiator 145. Electrical disconnects according to some embodiments of the present technology may be incorporated in mobile devices, which may cause vibration or re-orientation of the electrical disconnect during operation of the device. Post 166 may be included to maintain plunger 150 seated against the pyrotechnic initiator prior to firing. Post 166 may be sized in order to be characterized by a strength less than a sheer force that may be applied to the post 166 during firing of the pyrotechnic initiator. Accordingly, while maintaining the plunger in place during normal operation, upon ignition of the actuator, the plunger may sheer the post from the base of the housing as it travels along the track 160 in the base. In some embodiments, post 166 may be characterized by a scored or notched base, for example, which may facilitate sheering.

Base 107 may also define one or more ramps 167, which may be angled protrusions extending from the base of the housing within the track. The ramps may initially seat within partial recesses 165 defined within the plunger 150, which may be sized similarly to the ramps 167. This may allow the plunger to be engaged with the pyrotechnic initiator 145, without sitting on the ramps at a leading edge of the plunger. The recesses on the plunger may be the same size as the ramps, such that upon ignition of the actuator, the plunger may then ride over the ramps as it travels along the track. Once the plunger has fully traveled across the track towards the first end 112 of the housing, a backside of the plunger may be seated against the ramps, which may limit or prevent travel backwards along the track. This may ensure the busbar segments remain insulated and/or isolated from one another subsequent to actuation of the electrical disconnect, as will be described further below.

Figure 2:
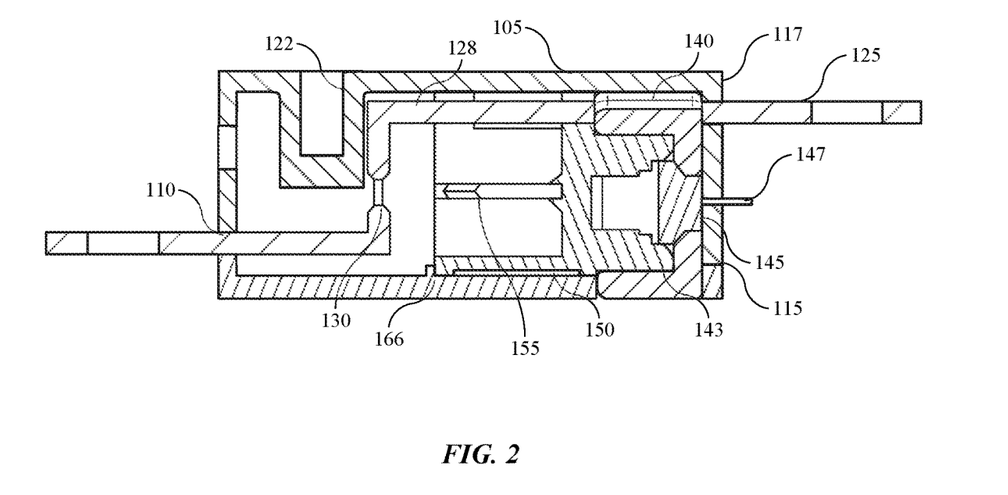
FIG. 2 shows a schematic cross-sectional view of an exemplary electrical disconnect according to embodiments of the present technology.

FIG. 2 shows a schematic cross-sectional view of exemplary electrical disconnect 100 according to embodiments of the present technology, and may illustrate the disconnect prior to actuation. As illustrated, the components may be disposed together within the housing 105, with barrel 140, or a boss of barrel 140, extending through a cutout in the second segment 128 of the busbar 125. Blade 155, as seated in plunger 150, may be laterally aligned with break section 130 of the busbar 125. Pyrotechnic initiator 145 may be operationally accessible through the second end 117 of the housing 105, such as having the electrical connector 147 extending through a back of barrel 140, as illustrated, which may allow engagement with a circuit board as will be described below, although not illustrated in this figure, or with an external triggering mechanism. Barrel 140 may define a recess 143 as previously discussed, which may extend to a backside of the barrel 140, such as in a counterbore or countersink profile, or in some combination as shown, which may allow the pyrotechnic initiator 145 to be seated within the barrel as well as accessed through the barrel.

As will be described further below, plunger 150 may be seated within the recess of the barrel, and may extend about the charge of the pyrotechnic initiator 145 as illustrated. As shown, the pyrotechnic initiator 145 may be positioned along a height of the housing between the first access 110 defined in the housing, and a location where the second segment 128 of the busbar 125 extends from the second access 115 defined in the housing. Additionally, post 166 may be included, which may seat the plunger in the first operational position, and limit or prevent movement of the plunger prior to triggering of the actuator. FIG. 2 also illustrates protrusion 122 recessed into the housing. As illustrated, the protrusion 122 extends along the arcuate portion of the second segment of the busbar, which may be adjacent or in contact with the protrusion 122. The protrusion may extend towards the break section 130 of the busbar, without extending into a plane through the break section in line with the blade 155, which may otherwise prevent complete travel of the blade.

Figure 3:
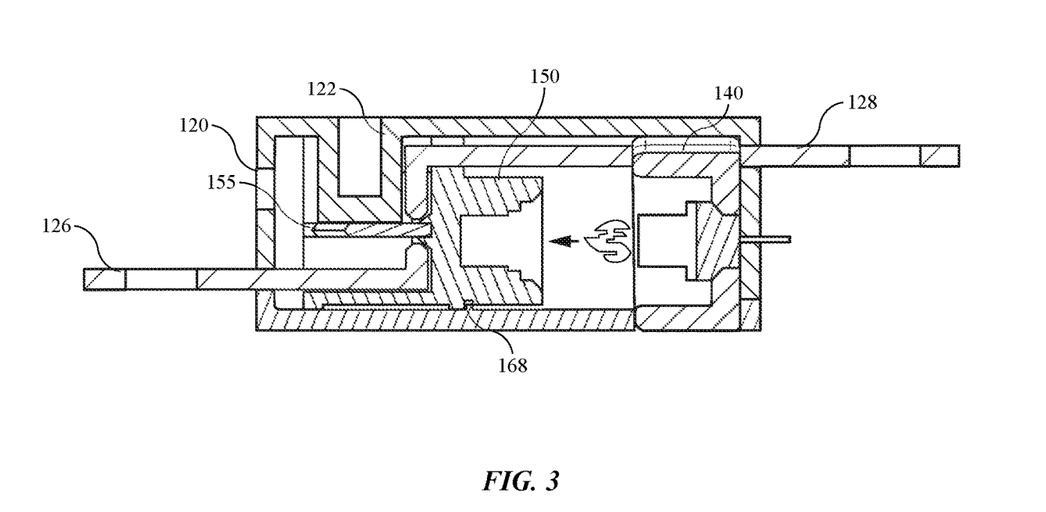
FIG. 3 shows a schematic cross-sectional view of an exemplary electrical disconnect according to embodiments of the present technology.

When the pyrotechnic initiator 145 is operated, plunger 150 may be expelled from the first position illustrated in FIG. 2 to a second position. FIG. 3 shows a schematic cross-sectional view of exemplary electrical disconnect 100 according to embodiments of the present technology, and may illustrate the disconnect subsequent to actuation, such as where the plunger has been expelled to a second operational position as illustrated, and in which the blade 155 has severed the busbar segments through the break section 130. As shown, ignition of the actuator may expel the plunger 150 from the barrel 140, which may remain in position within the housing in some embodiments. The expulsion may propel the plunger and blade to the stop at the first end of the housing, although in some embodiments as illustrated, travel of the plunger within the track may be halted prior to contacting the stop at the first end of the housing. As shown, blade 155 may sever the break section, and may extend beneath the inward protrusion 122 from the cover of the housing as previously described. Additionally, as noted above, protrusion 122 may not extend the full width of the housing, which may allow sidewalls of plunger 150 to travel past the protrusion as illustrated. However, protrusion 122 may extend to a location along the height of the housing by which the protrusion may engage with, or sit adjacent to, the blade when the plunger is in the second position, which may further encase the remaining end of the second segment of the busbar as illustrated.

Additionally, post 166 may be shorn from the base of the housing, and the plunger may ride over the ramp or ramps 168 remaining. After completing the travel, the plunger may be maintained in the second location by the ramps 168 as illustrated, which may limit or prevent travel backwards through the housing. Accordingly, first segment 126 of the busbar may be fully isolated from second segment 128 by the plunger and blade, which may be held in place by ramps 168, as well as with the protrusion 122, which may be seated adjacent the arcuate portion of the second segment of the busbar. Accordingly, arcing may be limited or prevented between the two busbar sections subsequent operation of the electrical disconnect. Because spacing may be maintained between the housing cover and the plunger, generated gas may flow with and/or over the plunger to be released through vents 120 at the first end of the housing. Accordingly, in embodiments of the present technology, the plunger 150 may be moveably disposed within the housing of the electrical disconnect between a first position and a second position. In the first position, the pyrotechnic initiator may be adjacent the plunger, as shown in FIG. 2, and a leading edge of the blade 155, facing the busbar, may be positioned on a first side of the break section of the busbar, such as between the busbar and the second end of the housing. Additionally, in the second position, the leading edge of the blade 155 may be located on a second side of the break section of the busbar, such as between the busbar and the first end of the housing, as illustrated in FIG. 3.

Figure 4A:
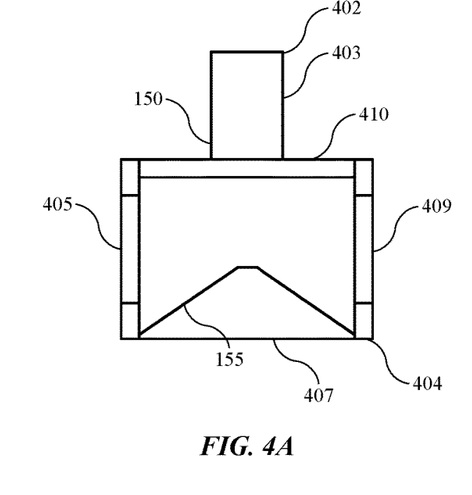
FIG. 4A shows a schematic top view of an exemplary blade and plunger for electrical disconnects according to embodiments of the present technology.

Turning to FIG. 4A is shown a schematic top view of an exemplary blade and plunger for electrical disconnects according to embodiments of the present technology, such as plunger 150 and blade 155 described above. As shown, plunger 150 may be characterized by a first end 402, which may be engaged with a barrel as previously described, and a second end 404 opposite the first end, and which may be facing the break section of the busbar as previously described. First end 402 may include a post 403 as illustrated, which may be characterized by an exterior diameter that is less than or equal to a diameter of the recess defined in the barrel, such as recess 143 of barrel 140 previously described. This may allow the first end of the plunger to be disposed within the barrel as shown previously.

Plunger 150 may also include a blade housing 405, which may include a base 407, sidewalls 409, and a back wall 410, from which post 403 may extend. While the plunger is in the first position within the housing, base 407 may sit against the post, such as post 166 discussed above, and may define the recesses at the front end for receiving the ramps. When the plunger is in the second position within the housing, back wall 410 may be seated against the front of the ramps, which may prevent backwards travel of the plunger 150 within the housing. Blade 155 may be seated within a recess defined in each of the sidewalls 409. Blade 155 may be a ceramic, a plastic, or any other insulative or dielectric material in some embodiments of the present technology. This may allow the blade and housing, which may also be a ceramic, a plastic, or any other insulative or dielectric material, to insulate the first segment and the second segment of the busbar from one another. This may prevent arcing between the severed components.

Although illustrated with a V-shape along a leading edge of the blade, blade 155 may be characterized by any number of shapes or profiles. For example, the blade may be characterized by an angle extending from one side to the other, such as a guillotine blade. However, testing has illustrated that a guillotine blade may be impacted by friction during the severing operation, and may fail to fully sever the segments of the busbar, or may require a pyrotechnic initiator characterized by a greater charge that can increase the force with which the blade may operate. By utilizing a blade shape that may contact both edges of the break section of the busbar simultaneously, improved severing may be afforded. As the force may reduce during the severing operation, incorporating an aperture in a central location of the busbar break section may ensure the last-contacted locations may be severed. Accordingly, in some embodiments, blades 155 may be characterized by a shape affording two or more points of contact on the break section, such as a V-shaped blade, a half-moon shape, a W-shape, or any other shape affording additional contact.

Figure 4B:
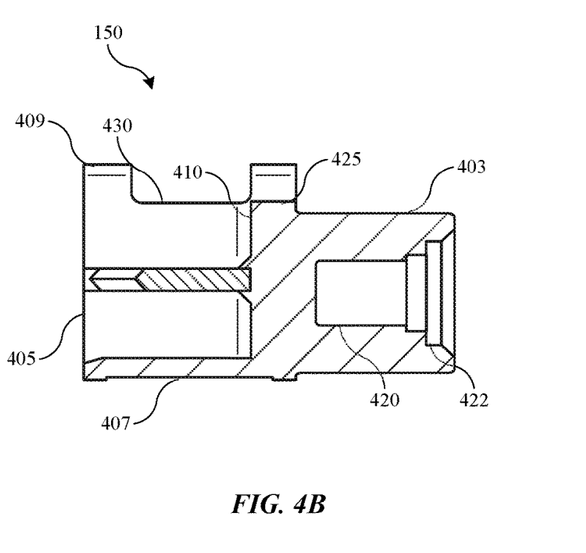
FIG. 4B shows a schematic cross-sectional view of an exemplary blade and plunger for electrical disconnects according to embodiments of the present technology.

FIG. 4B shows a schematic cross-sectional view of an exemplary blade and plunger for electrical disconnects according to embodiments of the present technology, such as plunger 150 and blade 155 described above, and may illustrate additional features of the plunger 150. As shown, a recess 420 may be formed in the first end of the plunger, such as within post 403. The recess may be sized to receive the pyrotechnic initiator, or a charge of the initiator, as previously illustrated and discussed, such as when the plunger is in a first position prior to actuation of the electrical disconnect. The recess may be characterized by a number of features to accommodate the geometry of the initiator, for example, and in some embodiments the recess may define a ledge 422, against which an elastomeric element may be seated. By incorporating the o-ring about the charge, and seating the o-ring in the plunger, backflow of gases generated during ignition may be limited or prevented, which may maximize force generated in a direction of travel towards the break section of the busbar.

Plunger 150 may include a blade housing 405 as discussed above, which may include sidewalls 409, base 407, and back wall 410. As also shown in several previous figures, back wall 410 may define a recess 425, which may allow the second segment of the busbar to be seated along the back wall, and which may further reduce a height of the electrical disconnect by affording an incorporation of the busbar recessed within the plunger wall. Sidewalls 409 may extend on either side of the second segment of the busbar, and may be sized to a height to be in line with the busbar. This may facilitate more linear travel of the plunger by allowing both a track in the base and the second segment of the busbar to guide the plunger during travel. In some embodiments, sidewalls 409 may also define a recess 430, which may facilitate flow of generated gas about the components as the gases travel to the vents.

Figure 5:
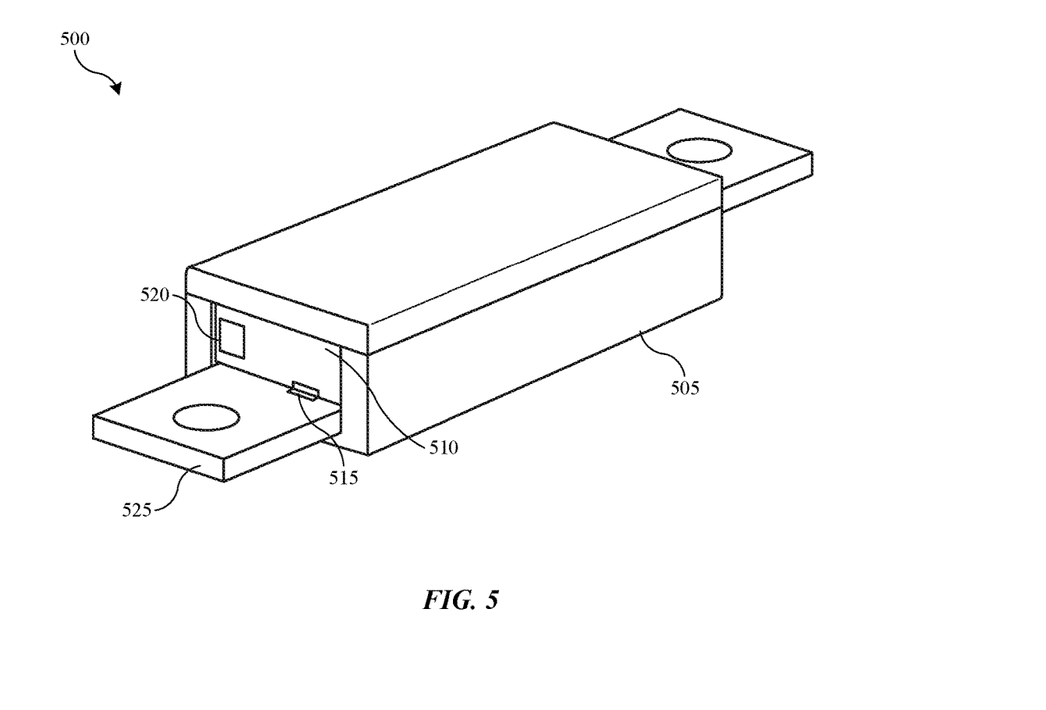
FIG. 5 shows a schematic perspective view of an exemplary electrical disconnect according to embodiments of the present technology.

Electrical disconnects according to the present technology may be operated by any number of mechanisms, including passive operation and active actuation, such as by an external management system. FIG. 5 shows a schematic perspective view of an exemplary electrical disconnect 500 according to some embodiments of the present technology, and may illustrate an electrical disconnect incorporating a circuit board that may monitor and/or control operation of the electrical disconnect. Electrical disconnect 500 may include any component, feature, or characteristic of electrical disconnect 100 described above, and may illustrate a circuit that may be part of electrical disconnect 100, such as coupled with the electrical connector of the pyrotechnic initiator of the disconnect, and seated adjacent the barrel at the second access of the housing. For example, the view illustrated may be an inverted view of electrical disconnect 100 with a base of the housing being illustrated at the top, and where the circuit board is disposed adjacent the barrel at the second end of the electrical disconnect.

As shown, a housing 505 of the electrical disconnect may incorporate a circuit board 510, which may monitor one or more aspects of the electrical disconnect, and may operate the disconnect in some embodiments. As illustrated, an electrical coupling 515, such as a trace or winding, may be incorporated between the circuit board 510 and a busbar 525 of the electrical disconnect. The electrical coupling 515 may be any number of sensing components, such as a shunt including an electrical contact on each end of the busbar, a hall-effect non-contact sensor extending about the busbar, a fluxgate sensor embedded in a shunt, or any other contact or component that may measure voltage or current. The coupling 515 may be communicatively coupled with the circuit board, such as with one or more sensors that may receive voltage, current, temperature, or any other reading from the electrical coupling 515. A processor 520 may perform one or more operations, including comparing readings with threshold values to determine whether a fault has occurred, such as performing overcurrent detection. The processor 520 may provide instructions to trigger the pyrotechnic initiator based on comparisons performed, which may fire the actuator and cause the disconnect to sever the busbar as previously described. The processor 520 may also be configured to receive signals, such as from an external management system, including a battery management system, for example, which may instruct the processor to trigger the pyrotechnic initiator.

Figure 6:
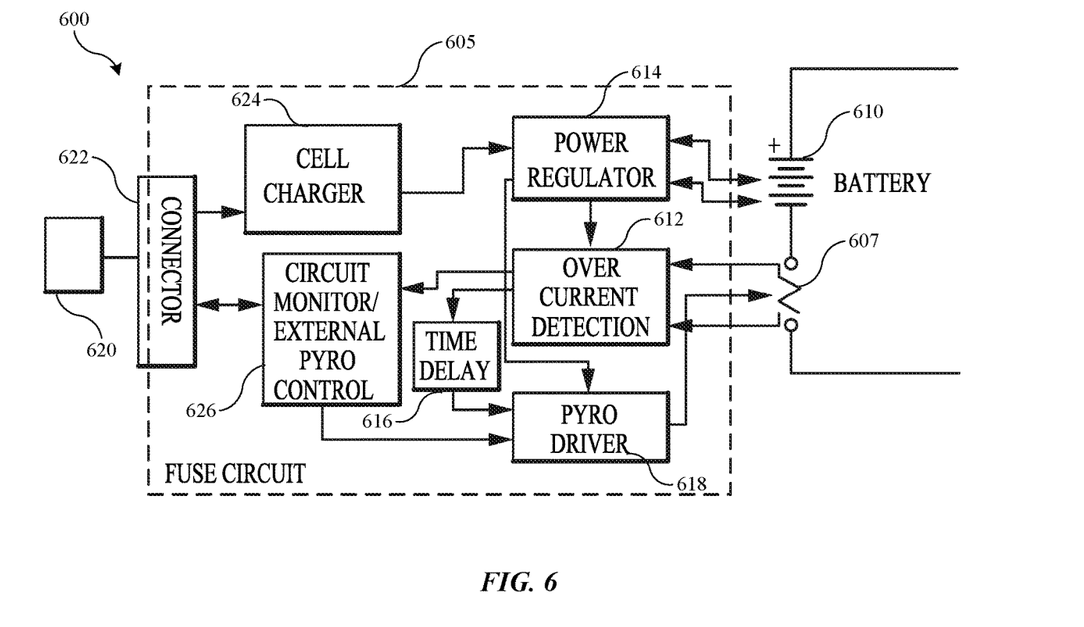
FIG. 6 shows a schematic circuit diagram of an exemplary electrical disconnect control circuit according to embodiments of the present technology.

Control circuits that may be used in electrical disconnects according to embodiments of the present technology may be characterized by any number of components. FIG. 6 shows a schematic circuit diagram of an exemplary electrical disconnect 600 according to embodiments of the present technology, such as may be incorporated in an electrical system, including a battery system in some embodiments. Electrical disconnect 600 may include a control circuit 605, as illustrated, and which may be included or used with any of the electrical disconnects or components previously described. As illustrated, a battery 610 may power the control circuit 605, and may be any battery. In some embodiments the battery may be a primary battery incorporated in the circuit board for powering the control circuit. Additionally, the battery may be a battery or battery system being monitored, where one or more cells of the battery may power the control circuit 605. The battery 610 may also be a capacitor, such as a slow-charge capacitor that is powered through system use.

The control circuit may include one or more circuit components including an overcurrent detection 612, which may receive readings across the busbar, and determine whether a threshold has been exceeded. A power regulator 614 may power the driver for triggering the pyrotechnic initiator 607, and which may also regulate the power of the battery 610. For example, the power regulator may power the active components by drawing power from the battery, as well as may provide power to the battery, such as for balancing as will be explained below. A time delay 616 may be incorporated, which may ensure an overcurrent threshold has been exceeded for sufficient time prior to activating the trigger, and which may protect against power fluctuations, for example. Additionally, a driver 618 may provide a signal to fire the pyrotechnic initiator and sever the busbar.

As noted above, in some embodiments, one or more battery cells of a battery system being monitored may be used to power the control circuit. The power consumed by the control circuit may cause cell balancing to be compromised if the consumed power is not restored. An external battery management system 620 may be actively monitoring the cells in the battery, and may provide an indication to the control circuit to provide power to the cells with which the control circuit is coupled. The control circuit may include a connector 622 that can receive signals, external power, or instructions from the battery management system. A cell charger 624 may be included to provide power or instructions for adding charge to battery cells, such as with the power regulator, which may allow the battery cells from which power is being drawn to remain in balance with other cells. A circuit monitor 626 may be included, which may receive signals from the battery management system to actively operate the disconnect. For example, despite a lack of overcurrent detection, an external command may be provided to trigger the pyrotechnic initiator and sever the busbar. Accordingly, both passive operation and active operation may be provided in embodiments of the present technology.

Figure 7:
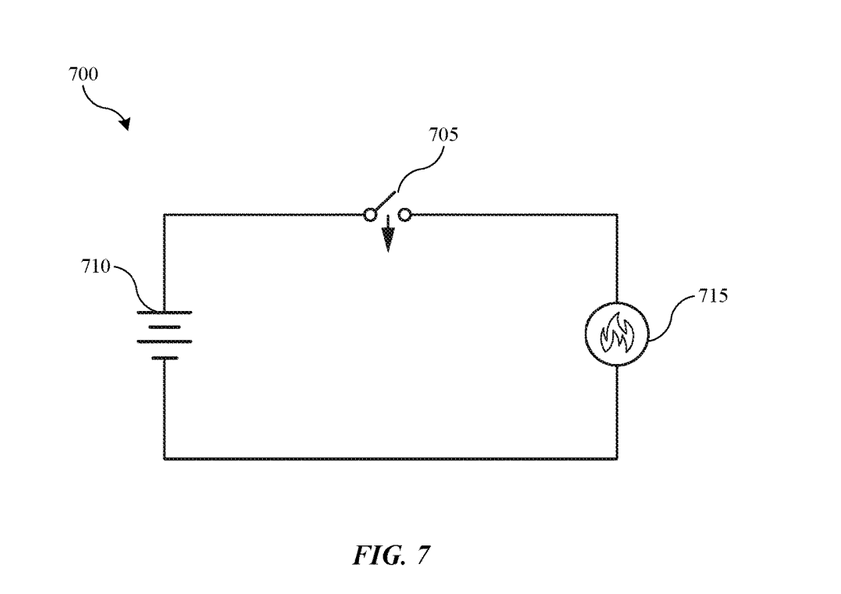
FIG. 7 shows a schematic circuit diagram of an exemplary electrical disconnect control circuit according to embodiments of the present technology.

FIG. 7 shows a schematic circuit diagram of an exemplary electrical disconnect control circuit 700 according to embodiments of the present technology. The control circuit 700 may include any feature or component previously described, and may provide an additional activation system for the electrical disconnect. For example, a switch 705, such as a Lorentz force switch, may be coupled in series with a battery 710 and the trigger for the pyrotechnic initiator 715. The switch may be coupled with the busbar, and when the switch is exposed to a sufficient current travelling on the busbar, such as beyond a threshold, the switch 705 may be closed. This may complete the circuit loop, causing the battery 710 to provide power to the pyrotechnic initiator 715 and actuate the disconnect. FIG. 6 and FIG. 7 are included as possible control schemes for electrical disconnects encompassed by the present technology, and it is to be understood that any other control circuit or engagement that may operate the disconnect is similarly encompassed by the present technology.

Figure 8:
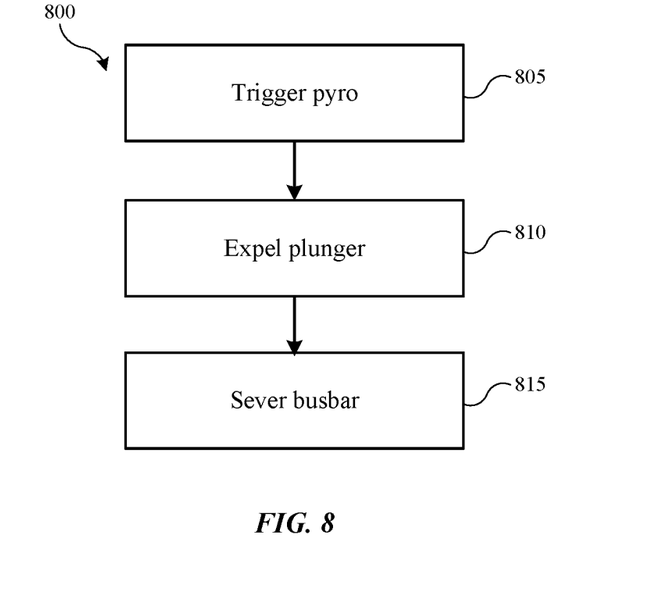
FIG. 8 shows selected operations in a method of operating an electrical disconnect according to embodiments of the present technology.

FIG. 8 shows selected operations in a method 800 of operating an electrical disconnect according to embodiments of the present technology, operations of which may be performed, for example, on any disconnects discussed throughout the present disclosure. Method 800 may include one or more operations prior to the initiation of the stated method operations, including any number of optional or additional operations, which may or may not specifically be associated with the method according to the present technology. For example, many of the operations are described in order to provide a broader scope of the electrical disconnect operation, but are not critical to the technology, or may be performed by alternative methodology. Additional operations may include sensing operations, such as previously described, and which may be performed as leading to operations noted in the method.

At operation 805, a pyrotechnic initiator may be triggered, such as actively by an external management system, or passively, such as by detection of an overcurrent or other fault scenario. The trigger may cause a gas generation to occur, which may expel a plunger operatively engaged with the pyrotechnic initiator at operation 810. The plunger may include a blade as previously described, and the blade may sever a busbar of the electrical disconnect at operation 815. By utilizing electrical disconnects according to embodiments of the present technology, less space may be occupied by the disconnect, and improved actuation and insulation of busbar components may be afforded.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "an aperture" includes a plurality of such apertures, and reference to "the busbar" includes reference to one or more busbars and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

The invention claimed is:
1. An electrical disconnect comprising:
a housing defining a first access at a first end of the housing and a second access at a second end of the housing opposite the first end of the housing, the first end horizontally displaced from the second end, wherein the second access extends vertically along a height of the housing beyond a vertical location of the first access;
a busbar characterized by a first segment and a second segment, wherein the first segment and the second segment are coupled at a break section of the busbar, wherein the first segment of the busbar extends through the first access of the housing, and wherein the second segment of the busbar extends through the second access of the housing;
a pyrotechnic initiator disposed within the housing;
a blade laterally aligned with the break section of the busbar; and
a plunger attached to the blade.

2. The electrical disconnect of claim 1, wherein the pyrotechnic initiator is operationally accessible from the second end of the housing, and wherein the pyrotechnic initiator is positioned along a height of the housing between the first access defined in the housing and a location where the second segment of the busbar extends from the second access defined in the housing.

3. The electrical disconnect of claim 1, further comprising:
a barrel defining a recess in which the pyrotechnic initiator is seated.

4. The electrical disconnect of claim 3, wherein a portion of the barrel extends within a recess defined within the busbar.

5. The electrical disconnect of claim 3, wherein a first end of the plunger is characterized by an exterior diameter less than a diameter of the recess defined in the barrel, and wherein the first end of the plunger is disposed within the recess of the barrel.

6. The electrical disconnect of claim 5, wherein the plunger defines a recess in the first end of the plunger, and wherein the pyrotechnic initiator extends within the recess defined in the first end of the plunger when the plunger is located in a first position within the housing.

7. The electrical disconnect of claim 1, wherein the plunger is moveably disposed within the housing between a first position within the housing in which the pyrotechnic initiator is adjacent the plunger and a leading edge of the blade is positioned on a first side of the break section of the busbar, and a second position within the housing in which the leading edge of the blade is located on a second side of the break section of the busbar opposite the first side of the break section.

8. The electrical disconnect of claim 1, wherein the second segment of the busbar at the second access extends substantially parallel to the first segment of the busbar at the first access, and wherein the break section of the busbar extends normal to the first segment of the busbar at the first access and the second segment of the busbar at the second access.

9. The electrical disconnect of claim 8, wherein the housing defines a protrusion extending from a top of the housing towards the break section of the busbar and adjacent the second segment of the busbar.

10. The electrical disconnect of claim 1, wherein the break section of the busbar is characterized by a thickness less than a thickness of either the first segment of the busbar or the second segment of the busbar.

11. The electrical disconnect of claim 1, wherein the blade is ceramic.

12. The electrical disconnect of claim 11, wherein the blade is characterized by a V-shape along a leading edge of the blade.

13. The electrical disconnect of claim 1, wherein the plunger comprises a blade housing characterized by a base and sidewalls, and wherein the sidewalls of the blade housing extend on opposite sides and in line with the second segment of the busbar.

14. The electrical disconnect of claim 13, wherein a base of the housing defines an angled protrusion over which the base of the blade housing may travel during operation of the electrical disconnect.

15. The electrical disconnect of claim 1, further comprising:
an activation circuit comprising overcurrent detection coupled with the busbar, wherein the overcurrent detection is communicatively coupled with a trigger of the pyrotechnic initiator.

16. The electrical disconnect of claim 15, wherein the activation circuit further comprises:
a connector coupleable with an external management system and operable to receive a signal from the external management system to trigger the pyrotechnic initiator.

17. An electrical disconnect comprising:
a housing defining a first access at a first end of the housing and a second access at a second end of the housing opposite the first end of the housing, wherein the second access extends vertically along a height of the housing beyond a vertical location of the first access, wherein a base of the housing defines a track, and where the housing defines a vent at the first end of the housing;
a busbar characterized by a first segment and a second segment, wherein the first segment of the busbar extends through the first access of the housing, and wherein the second segment of the busbar extends through the second access of the housing;
a barrel positioned proximate the second end of the housing;
a pyrotechnic initiator disposed within the barrel and electrically accessible through the second end of the housing;
a blade; and
a plunger attached to the blade, wherein the plunger is movably disposed within the track defined in the base of the housing.

18. The electrical disconnect of claim 17, wherein the plunger comprises a blade housing characterized by a base and sidewalls, wherein the sidewalls of the blade housing extend on either side and in line with the second segment of the busbar, and wherein the base of the blade housing is seated in the track defined in the base of the housing.

19. An electrical disconnect comprising:
a housing defining a first access at a first end of the housing and a second access at a second end of the housing opposite the first end of the housing, wherein the second access extends vertically along a height of the housing beyond a vertical location of the first access;

a busbar characterized by a first segment and a second segment, wherein the first segment and the second segment are coupled at a break section of the busbar, wherein the first segment of the busbar extends through the first access of the housing, wherein the second segment of the busbar extends through the second access of the housing, wherein the second segment of the busbar at the second access extends substantially parallel to the first segment of the busbar at the first access, and wherein the break section of the busbar extends normal to the first segment of the busbar at the first access and the second segment of the busbar at the second access;

a pyrotechnic initiator disposed within the housing;

a blade laterally aligned with the break section of the busbar; and a plunger attached to the blade.

20. The electrical disconnect of claim 19, wherein the plunger is moveably disposed within the housing between a first position within the housing in which the pyrotechnic initiator is adjacent the plunger and a leading edge of the blade is positioned on a first side of the break section of the busbar, and a second position within the housing in which the leading edge of the blade is located on a second side of the break section of the busbar opposite the first side of the break section.

* * * * *